(12) United States Patent
Lee et al.

(10) Patent No.: US 12,284,697 B2
(45) Date of Patent: Apr. 22, 2025

(54) DIRECT COMMUNICATION SESSION MANAGEMENT METHOD AND APPARATUS IN WIRELESS COMMUNICATION SYSTEM

(71) Applicant: Samsung Electronics Co., Ltd., Suwon-si (KR)

(72) Inventors: Hoyeon Lee, Suwon-si (KR); Sunghoon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 403 days.

(21) Appl. No.: 17/765,815

(22) PCT Filed: Sep. 25, 2020

(86) PCT No.: PCT/KR2020/013093
§ 371 (c)(1),
(2) Date: Mar. 31, 2022

(87) PCT Pub. No.: WO2021/066408
PCT Pub. Date: Apr. 8, 2021

(65) Prior Publication Data
US 2022/0304085 A1    Sep. 22, 2022

(30) Foreign Application Priority Data

Oct. 1, 2019    (KR) .................... 10-2019-0121744

(51) Int. Cl.
*H04W 76/14* (2018.01)
*H04W 76/23* (2018.01)
*H04W 92/18* (2009.01)

(52) U.S. Cl.
CPC ........... *H04W 76/14* (2018.02); *H04W 76/23* (2018.02); *H04W 92/18* (2013.01)

(58) Field of Classification Search
CPC .......... H04W 4/24; H04W 8/24; H04W 4/40; H04W 8/08; H04W 60/00; H04W 76/25;
(Continued)

(56) References Cited

U.S. PATENT DOCUMENTS 9,877,349 B2    1/2018 Kim et al.
11,109,355 B2 *  8/2021 Zhou ..................... H04W 72/02
(Continued)

FOREIGN PATENT DOCUMENTS

CN          105247947 A    1/2016
KR    10-2021-0023299 A    3/2021
(Continued)

OTHER PUBLICATIONS

Translation of the Written Opinion of the International Searching Authority dated Jan. 12, 2021, in connection with International Application No. PCT/KR2020/013093, 8 pages.
(Continued)

*Primary Examiner* — Jung Liu

(57) ABSTRACT

Provided are a method and user equipment for performing device-to-device communication by a user equipment in a wireless communication system, the method, performed by a user equipment, of performing device-to-device communication in a wireless communication system may include: receiving information about a data path, from a network entity; determining, based on the information about the data path, a data path for the device-to-device communication as a path through a Uu interface or a path through a PC5 interface; and performing the device-to-device communication via the determined data path.

8 Claims, 9 Drawing Sheets

(58) Field of Classification Search
CPC ... H04W 76/14; H04W 76/23; H04W 36/033;
H04W 4/46; H04W 40/20; H04W 40/12;
H04M 15/00; H04M 15/66; H04M 15/93;
H04M 15/8033; H04M 15/81; H04M
15/8044; H04M 15/8055; H04M 15/8016;
H04L 12/1403; H04L 12/14; H04L
12/1407; H04L 69/14
See application file for complete search history.

(56) References Cited

U.S. PATENT DOCUMENTS

| 11,432,135 | B2* | 8/2022 | Shan | H04L 12/1403 |
|---|---|---|---|---|
| 2014/0295868 | A1 | 10/2014 | Lee | |
| 2014/0341112 | A1 | 11/2014 | Agiwal et al. | |
| 2015/0156702 | A1 | 6/2015 | Stojanovski et al. | |
| 2017/0048739 | A1 | 2/2017 | Jeong et al. | |
| 2017/0079081 | A1 | 3/2017 | Kim et al. | |
| 2017/0150490 | A1 | 5/2017 | Chen et al. | |
| 2019/0037448 | A1 | 1/2019 | Shan et al. | |
| 2019/0313376 | A1* | 10/2019 | Zhou | H04W 76/23 |
| 2022/0225448 | A1* | 7/2022 | Li | H04W 60/04 |
| 2022/0322202 | A1* | 10/2022 | Li | H04M 15/93 |
| 2023/0063242 | A1* | 3/2023 | Shan | H04W 4/24 |

FOREIGN PATENT DOCUMENTS

| WO | 2015004142 A1 | 1/2015 |
|---|---|---|
| WO | 2015137631 A1 | 9/2015 |
| WO | 2015163743 A1 | 10/2015 |
| WO | 2017039735 A1 | 3/2017 |
| WO | 2018169382 A1 | 9/2018 |

OTHER PUBLICATIONS

International Search Report and Written Opinion of the International Searching Authority dated Jan. 12, 2021, in connection with International Application No. PCT/KR2020/013093, 9 pages.

Supplementary European Search Report dated Sep. 23, 2022, in connection with European Application No. 20873317.0, 11 pages.

Huawei, et al., "Path switch procedure from cellular link to relay link," R2-1703473, 3GPP TSG-RAN WG2 Meeting #97bis, Spokane, Washington, USA, Apr. 3-7, 2017, 5 pages.

Nokia, et al., "Service Continuity handling with eRelay-UE scenario," S2-173412, SA WG2 Meeting #S2-121, Hangzhou, China, May 29-Jun. 2, 2017, 3 pages.

OPPO, "Consideration on Solutions for Path Switch between PC5 and Uu," R2-1704074, 3GPP TSG-RAN2 #98, Hangzhou, China, May 15-19, 2017, 2 pages.

The First Office Action dated Jun. 26, 2024, in connection with Chinese Application No. 202080069236.4, 15 pages.

Communication pursuant to Article 94(3) EPC dated Jul. 16, 2024, in connection with European Application No. 20873317.0, 7 pages.

Huawei, et al., "Path switch procedure between Uu and PC5," R2-1704715, 3GPP TSG-RAN WG2 Meeting #98, Hangzhou, China, May 15-19, 2017, 5 pages.

Huawei, et al., "KI5 and KI11: Update of Solution 3 for PC5 vs Uu interface selection," S2-1812389 (Revision of S2-181xxxx), SA WG2 Meeting #129bis, West Palm Beach, FL, USA, Nov. 26-30, 2018, 4 pages.

Notice of Allowance dated Feb. 8, 2025, in connection with Chinese Application No. 202080069236.4, 7 pages.

* cited by examiner

US 12,284,697 B2

DIRECT COMMUNICATION SESSION MANAGEMENT METHOD AND APPARATUS IN WIRELESS COMMUNICATION SYSTEM

CROSS-REFERENCE TO RELATED APPLICATIONS

This application is a 371 National Stage of International Application No. PCT/KR2020/013093, filed Sep. 25, 2020, which claims priority to Korean Patent Application No. 10-2019-0121744, filed Oct. 1, 2019, the disclosures of which are herein incorporated by reference in their entirety.

BACKGROUND

1. Field

The present disclosure relates to a method and apparatus for providing proximity-based services (ProSe) to a user equipment.

2. Description of Related Art

To meet the increase in demand with respect to wireless data traffic after the commercialization of 4th generation (4G) communication systems, considerable efforts have been made to develop pre-5th generation (5G) communication systems or 5G communication systems. This is one reason why '5G communication systems' or 'pre-5G communication systems' are called 'beyond 4G network communication systems' or 'post Long-Term Evolution (LTE) systems.'

In order to achieve a high data rate, 5G communication systems are being developed to be implemented in a super-high frequency band (millimeter wave (mmWave)), e.g., a band of 60 GHz. In order to reduce the path loss of radio waves in such a super-high frequency band and to increase a transmission distance of radio waves in 5G communication systems, various technologies have been discussed and are being studied, for example: beamforming, massive multiple-input multiple-output (MIMO), full dimensional MIMO (FD-MIMO), array antennas, analog beam-forming, and large-scale antennas.

In order to improve system networks for 5G communication systems, various technologies have been developed, e.g., evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation.

Also, for 5G systems, other technologies have been developed, e.g., hybrid frequency-shift keying (FSK) and quadrature amplitude modulation (QAM) (FQAM) and sliding window superposition coding (SWSC), which are advanced coding modulation (ACM) schemes, and filter bank multi carrier (FBMC), non-orthogonal multiple access (NOMA), and sparse code multiple access (SCMA), which are advanced access schemes.

The Internet has evolved from a human-based connection network, where humans create and consume information, to the Internet of things (IoT), where distributed components, such as objects, exchange information with each other to process the information. Internet of Everything (IoE) technology is emerging, in which technology related to the IoT is combined with, for example, technology for processing big data through connection with a cloud server. In order to implement the IoT, various technological components are required, such as sensing technology, wired/wireless communication and network infrastructures, service interface technology, security technology, etc. In recent years, technologies including a sensor network for connecting objects, machine-to-machine (M2M) communication, machine type communication (MTC), etc. have been studied. In the IoT environment, intelligent Internet technology (IT) services may be provided to collect and analyze data obtained from objects connected to each other to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to the IoT network. For example, technologies related to sensor networks, M2M communication, MTC, etc., are being implemented by using 5G communication technology including beam-forming, MIMO, array antennas, etc. The application of Cloud-RAN as a big data processing technology described above may be an example of convergence of 5G communication technology and IoT technology.

As various services have become available according to the above-described technology and the development of mobile communication systems, in particular, a method of enabling a user equipment to directly communicate with another user equipment is required.

A mobile communication system may provide device-to-device direct communication (ProSe communication, PC5 communication, sidelink communication, or device-to-device (D2D) communication) services. In order to provide device-to-device direct communication, a network function (NF) for providing a direct communication service is defined, and a protocol between a user equipment (UE) and an NF and a protocol between an application function (AF) and an NF may be defined. In addition, a 5G core network (core network, CN) may be connected to a base station to provide information necessary for direct communication, to the base station and a user equipment. In addition, a user equipment may request radio resources necessary for direct communication, from a base station, and the base station may allocate the radio resources to the user equipment.

SUMMARY

A user equipment may perform device-to-device direct communication (PC5 communication) in order to exchange data with other user equipments. Alternatively, a user equipment may perform network communication (Uu communication) through a network (e.g., a base station, a 3GPP network through a core network) in order to exchange data with other user equipments.

In the present disclosure, a method for a user equipment to determine a communication path (PC5 communication or Uu communication) and a method for a user equipment to switch the communication path (PC5 to Uu or Uu to PC5) are proposed.

According to an embodiment of the present disclosure, a method, performed by a user equipment, of performing device-to-device communication in a wireless communication system, may include: receiving information about a data path, from a network entity; determining, based on the information about the data path, a data path for the device-to-device communication as a path through a Uu interface or a path through a PC5 interface; and performing the device-to-device communication via the determined data path.

According to an embodiment of the present disclosure, a user equipment for performing device-to-device communication in a wireless communication system, may include: a transceiver; and a processor that is connected to the transceiver and configured to: receive information about a data path, from a network entity; determine, based on the information about the data path, a data path for the device-to-device communication as a path through a Uu interface or a path through a PC5 interface; and perform the device-to-device communication via the determined data path.

DETAILED DESCRIPTION

Figure 1:
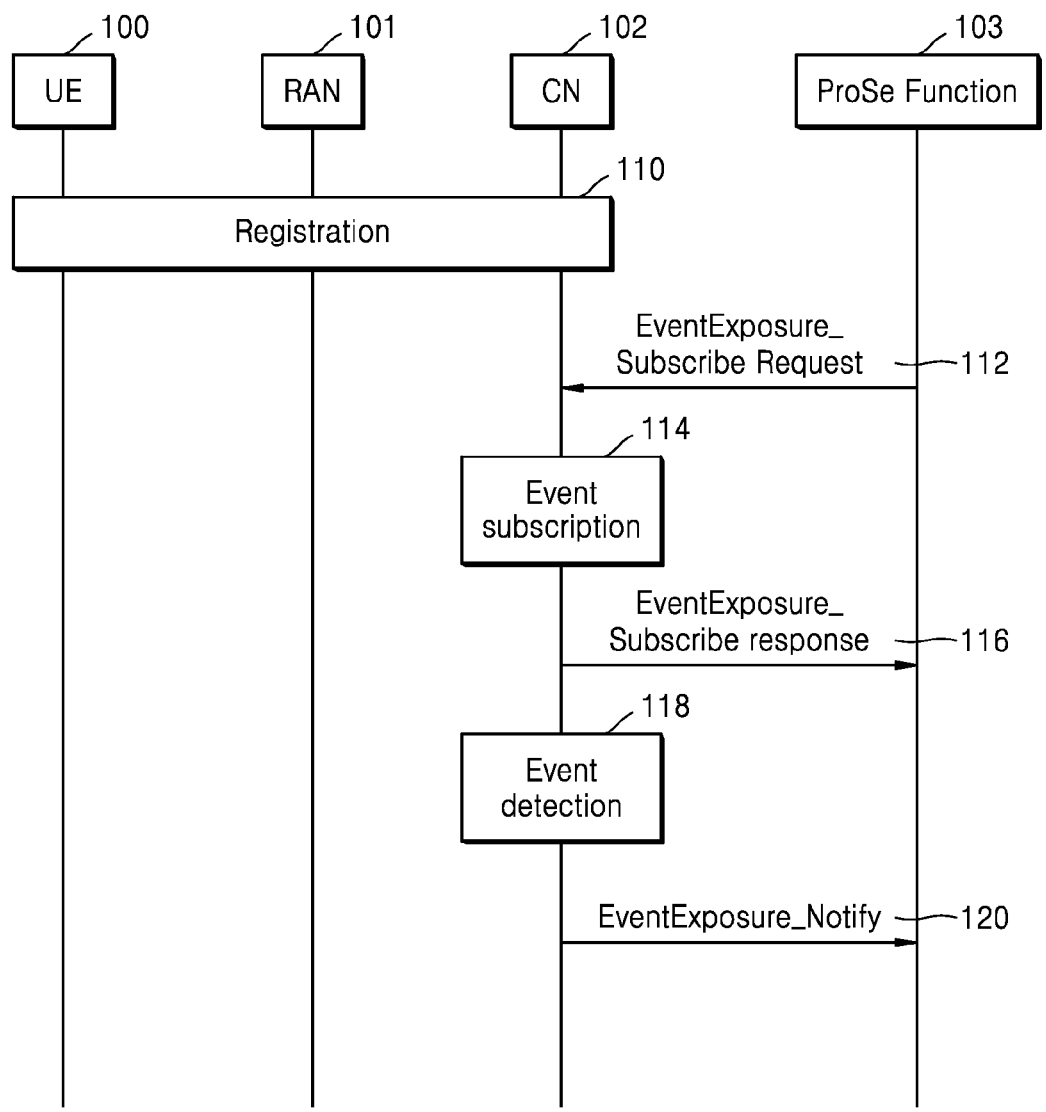
FIG. 1 illustrates a user equipment registration procedure according to an embodiment of the present disclosure.

Hereinafter, embodiments of the present disclosure will be described more fully with reference to the accompanying drawings.

In the description of the embodiments, descriptions of technical contents that are well known in the art to which the present disclosure pertains and are not directly related to the present disclosure will be omitted. This is to clearly convey the gist of the present disclosure without obscuring the gist of the present disclosure by omitting unnecessary description.

For the same reason, in the attached drawings, each component is exaggerated, omitted, or schematically illustrated. In addition, the size of each component does not fully reflect the actual size. Those components that are the same or are in correspondence are rendered the same reference numeral regardless of the figure number.

The advantages and features of the present disclosure and methods of achieving the advantages and features will become apparent with reference to embodiments of the present disclosure described in detail below with reference to the accompanying drawings. The present disclosure may, however, be embodied in many different forms and should not be construed as being limited to the embodiments set forth herein; rather, these embodiments of the present disclosure are provided so that this disclosure will be thorough and complete, and will fully convey the concept of the present disclosure to those skilled in the art, and the present disclosure is only defined by the scope of the claims. Throughout the specification, like reference numerals refer to like components.

It will be understood that each block of flowchart illustrations and combinations of blocks in the flowchart illustrations may be implemented by computer program instructions. These computer program instructions may be provided to a processor of a general-purpose computer, special purpose computer, or other programmable data processing equipment, such that the instructions, which are executed via the processor of the computer or other programmable data processing equipment, generate means for performing functions specified in the flowchart block(s). These computer program instructions may also be stored in a computer-executable or computer-readable memory that may direct a computer or other programmable data processing equipment to function in a particular manner, such that the instructions stored in the computer-executable or computer-readable memory may produce a manufactured article including instruction means that perform the functions specified in the flowchart block(s). The computer program instructions may also be loaded onto a computer or other programmable data processing equipment to cause a series of operational steps to be performed on the computer or other programmable data processing equipment to produce a computer-executable process such that the instructions that are executed on the computer or other programmable data processing equipment may provide steps for implementing the functions specified in the flowchart block or blocks.

In addition, each block may represent a module, segment, or portion of code, which includes one or more executable instructions for implementing specified logical function(s). It should also be noted that in some alternative implementations, the functions noted in the blocks may occur out of the presented order. For example, two blocks illustrated in succession may in fact be executed substantially concurrently or the blocks may sometimes be executed in the reverse order, according to the functionality involved.

The term "unit" or "~ er(or)" used herein denotes a software component or a hardware component such as a field-programmable gate array (FPGA) or an application-specific integrated circuit (ASIC), and performs a certain function. However, the term "unit" or "~er(or)" is not limited to software or hardware. The term "unit" or "~er(or)" may be configured to be included in an addressable storage medium or to reproduce one or more processors. Thus, according to an embodiment of the present disclosure, the term "unit" or "~er(or)" may include, by way of example, object-oriented software components, class components, and task components, and processes, functions, attributes, procedures, subroutines, segments of a program code, drivers, firmware, a micro code, a circuit, data, a database, data structures, tables, arrays, and variables. Functions provided by components and "units" or "~ers(ors)" may be combined into a smaller number of components and "units" or "~ers(ors)" or may be further separated into additional components and "units" or "~ers(ors)". In addition, the components and "units" or "~ers(ors)" may be implemented to operate one or more central processing units (CPUs) in a device or a secure multimedia card. Thus, according to an embodiment of the present disclosure, the term "unit" or "~er(or)" may include one or more processors.

Hereinafter, operation principles of the present disclosure will be described with reference to accompanying drawings. While describing the present disclosure, detailed description of related well-known functions or configurations may be omitted when it is deemed that they may unnecessarily obscure the essence of the present disclosure. Also, terms used below are defined in consideration of functions in the present disclosure, and may have different meanings according to an intention of a user or operator, customs, or the like. Thus, the terms should be defined based on the description throughout the specification. Hereinafter, a base station is an entity that assigns resources to of a user equipment, and may be at least one of a gNode B, an eNode B, a base station (BS), a wireless access unit, a base station controller, or a node on a network. Examples of a user equipment may include a user equipment (UE), a mobile station (MS), a cellular phone, a smartphone, a computer, or a multimedia system capable of performing a communication function. However, the present disclosure is not limited to the above-described examples.

Hereinafter, in the present disclosure, a technique for a user equipment to receive broadcast information from a base station in a wireless communication system is described. The present disclosure relates to a communication technique for converging, with IoT technology, a 5G communication system for supporting a higher data rate after a 4G system, and a system thereof. The present disclosure may be applied to intelligent services (e.g., smart homes, smart buildings, smart cities, smart cars or connected cars, healthcare, digital education, retail business, security and safety-related services, etc.) based on 5G communication technology and IoT-related technology.

The term referring to broadcast information, the term referring to control information, the term related to communication coverage, the term referring to a status change (e.g., an event), and the term referring to network entities, the term referring to messages, the term referring to components of a device, and the like, used in the following description, are examples provided for convenience of descriptions. However, the present disclosure is not limited by the following terms, and other terms having equivalent technical meanings may be used.

Herein, for convenience of descriptions, some terms and names defined in the 3rd generation partnership project long term evolution (3GPP LTE) standard may be used. However, the present disclosure is not limited by the above-described terms and names, and may be equally applied to systems conforming to other standards.

In regard to wireless communication systems, progress is underway from just providing voice-based services in the initial stage to broadband wireless communication systems for providing high-rate and high-quality packet data services such as communication standards including High Speed Packet Access (HSPA) of 3GPP, Long Term Evolution (LTE) or Evolved Universal Terrestrial Radio Access (E-UTRA), LTE-Advanced (LTE-A), LTE-Pro, High Rate Packet Data (HRPD) of 3GPP2, Ultra Mobile Broadband (UMB), and 802.16e of IEEE.

As a representative example of the broadband wireless communication systems, an LTE system has adopted an Orthogonal Frequency Division Multiplexing (OFDM) in a downlink (DL) and has adopted a Single Carrier Frequency Division Multiple Access (SC-FDMA) method in an uplink (UL). An uplink refers to a radio link through which a user equipment (UE) or a mobile station (MS) transmits data or a control signal to a base station (eNode B or base station (BS)), and a downlink refers to a radio link through which a base station transmits data or a control signal to a user equipment. In a multiple-access method, data or control information is identified for each user by allocating and operating time-frequency resources on which the data or control information is to be carried for each user, such that the time-frequency resources do not overlap each other, that is, such that orthogonality is established.

As a future communication system after LTE, that is, a 5G communication system, needs to be able to freely reflect various requirements such as from users and service providers, so services that satisfy various requirements are to be supported therefor. Services considered for the 5G communication system include Enhanced Mobile BroadBand (eMBB), massive Machine Type Communication (mMTC), and Ultra Reliability Low Latency Communication (URLLC). etc.

According to an embodiment of the present disclosure, eMBB aims to provide a data transmission rate that is more improved than the data transmission rate supported by the existing LTE, LTE-A, or LTE-Pro. For example, in the 5G communication system, eMBB should be able to provide a maximum data rate of 20 Gbps in a downlink and a maximum data rate of 10 Gbps in an uplink from a viewpoint of one base station. At the same time, it is necessary to provide an increased user perceived data rate of a user equipment. In order to satisfy the above requirements, it is required to improve transmission/reception technology, including a more advanced multi-input multi-output (MIMO) transmission technology. In addition, the data transmission rate required by the 5G communication system may be satisfied by using a frequency bandwidth wider than 20 MHz in a frequency band of 3 GHZ to 6 GHz or 6 GHz or more, instead of the 2 GHz band used by the current LTE.

At the same time, mMTC is being considered to support application services such as the Internet of Things (IoT) in the 5G communication system. In order to efficiently provide the Internet of Things, mMTC may require, in a cell, large-scale terminal access support, improvement in terminal coverage, improved battery life, and reduced terminal cost. Since the Internet of Things is attached to various sensors and various devices to provide communication functions, the Internet of Things is to support a large number of user equipments (e.g., 1,000,000 user equipments/km2) within a cell. In addition, due to the nature of services, as a user equipment supporting mMTC is highly likely to be located in a shaded area not covered by a cell, such as the basement of a building, the user equipment may require wider coverage compared to other services provided by the 5G communication system. A user equipment supporting mMTC should be configured by a low-cost terminal, and because it is difficult to frequently change a battery of the user equipment, a very long battery life time may be required.

Lastly, URLLC is a cellular-based wireless communication service used for a mission-critical purpose, and used in remote control of a robot or machinery, industrial automation, unmanned aerial vehicles, remote health care, emergency alert, etc., and is to provide communication that provides ultra-low latency and ultra-reliability. For example, a service supporting URLLC needs to satisfy an air interface latency of less than 0.5 milliseconds, and at the same time has a requirement of a packet error rate of 10-5 or less. Therefore, for a service supporting URLLC, the 5G system is to provide a smaller transmit time interval (TTI) than other services, and at the same time, a design requirement for allocating a wide resource in a frequency band is required. However, mMTC, URLLC, and eMBB described above are only examples of different service types, and the service types to which the present disclosure is applied are not limited to the above-described examples.

The services considered in the above-described 5G communication system are to be provided by convergence with each other based on one framework. That is, for efficient resource management and control, it is preferable that each service is integrated and controlled and transmitted as one system, rather than being operated independently.

In addition, although the embodiments of the present disclosure are described below by taking LTE, LTE-A, LTE Pro, or NR system as an example, the embodiments of the present disclosure may be applied to other communication systems having a similar technical background or channel type. In addition, the embodiments of the present disclosure may be applied to other communication systems through some modifications within a range that does not significantly depart from the scope of the present disclosure as judged by a person having skilled technical knowledge.

The term for identifying an access node used in the following description, the term referring to a network entity or NF (network function), the term referring to messages, the term referring to an interface between network entities, the term referring various identification information, or the like, are examples provided for convenience of descriptions. Thus, the present disclosure is not limited by the following terms, and other terms having equivalent technical meaning may be used.

Herein, for convenience of descriptions, some terms and names defined in the 3rd generation partnership project long term evolution (3GPP LTE) and 5th Generation (5G) standards may be used. However, the present disclosure is not limited by the terms and names, and may be equally applied to systems conforming to other standards.

Meanwhile, in the present disclosure, the term "service" may be interchangeably used with a specific communication equipment (or NF) performing a request from another communication equipment (or NF) (that is, referring to NF service), a service provided by a mobile communication operator (i.e., a voice service, a texting service, a data service, a communication service through a network (communication through a Uu interface) service, a direct communication service (communication through PC5 (sidelink) interface), or an application layer service provided by a Over The Top (OTT) operator (i.e., a messenger service, a game service, etc.).

A 5G core network according to an embodiment of the present disclosure may be configured with a network function (NF) such as AMF, SMF, ProSe function, PCF, NEF, UDM, UPF, UDR. A user equipment (User Equipment, Terminal, or UE) may access the 5G core network through a base station (RAN, Radio Access Network).

An Access and Mobility Management Function (AMF) is a network function that manages wireless network access and mobility for a user equipment. A Session Management Function (SMF) is a network function that manages a packet data network connection provided to a user equipment. A packet data network connection is referred to as a protocol data unit (PDU) session. PDU session information may include quality of service (QoS) information, charging information, or packet processing information. A Policy Control Function (PCF) is a network function for applying, to a user equipment, a service policy, a charging policy, and a policy for a PDU session, by a mobile communication operator. A Unified Data Management (UDM) is a network function that stores and manages subscriber information. A Network Exposure Function (NEF) is a network function that allows access to information for managing user equipments, in a 5G network. For example, the NEF may access information such as subscription to a mobility management event of a user equipment, subscription to a session management event of a user equipment, a request for session-related information, and setting of charging information of the user equipment, a request to change PDU session policy for the user equipment, or the like. The NEF is connected to the 5G core network NFs to deliver information about the user equipment to the NFs or to report information about the user equipment to the outside. An Application Function (AF) may use services and functions provided by the 5G network through the NEF.

A 5G-Radio Access Network (RAN) refers to a base station that provides a wireless communication function to a user equipment. The 5G-RAN may allocate a direct communication radio resource to the user equipment. A User Plane Function (UPF) acts as a gateway for transmitting packets transmitted and received by a user equipment, and is controlled by the SMF. The UPF is connected to a data network (DN) and performs a function of delivering data packets generated in the 5G system, to an external data network. For example, the UPF may be connected to a data network connected to the Internet, and may route a data packet sent by a user equipment, to the Internet. A Unified Data Repository (UDR) is a network function that stores and manages data. For example, the UDR may store user equipment subscription information and provide the user equipment subscription information to the UDM. The UDR may store operator policy information and provide the operator policy information to the PCF. The UDR may store network service exposure-related information and may provide the network service exposure-related information to the NEF.

A ProSe Function refers to a logical function that performs an operation of a network necessary to provide a proximity service. One or more ProSe Functions may exist in a Public Land Mobile Network (PLMN), and may be deployed to serve a specific area or to serve certain user equipments. The ProSe function may perform a direct provisioning function that provides information necessary for the user equipment to use a ProSe service. The direct provisioning function refers to a function of provisioning information needed for a direct discovery function used by user equipments which are in proximity to directly discover each other or a direct communication function used for a device-to-device (D2D) direct communication.

In addition, the ProSe Function may perform a function of managing a name or code used for direct discovery in order to support the direct discovery function in the user equipment. In addition, the ProSe Function may perform a triggering function so that a user equipment may perform a direct discovery function, and may also provide a charging function or security-related function with respect to the use of a ProSe service.

The ProSe Function according to an embodiment of the present disclosure may be referred to by a name other than the ProSe Function, and functions and operations provided by the ProSe Function (e.g., protocols and signaling procedures for communication between user equipment, NF and AF, etc.) may be provided by another NF (e.g., PCF, etc.).

Each NF defines services they provide, and the services provided by the NFs may be referred to as Npcf, Nsmf, Namf, Nnef services, and the like. For example, when an AMF delivers a session-related message to an SMF, the AMF may use a service (or API) called Nsmf_PDUSession_CreateSMContext. The ProSe Function also defines NF services and can be connected to other NFs. For example, a service provided by the ProSe Function may be defined as an Nprose service, and the ProSe Function may provide a service (or API) such as Nprose_event_notification.

An Application Function (AF) may be an application server (AS) that provides a function for using a ProSe service. That is, the AF may be a ProSe application server or a Network Controlled Interactive Service (NCIS) application server that provides an NCIS service. The ProSe application server or NCIS application server may operate like an AF of a 3GPP system.

In the 3GPP system, a special service for NCIS, called NCIS service, may be provided. The NCIS service may refer to a service that enables one or more user equipments to participate in an NCIS group and share data with each other for interactive gaming or data sharing. The NCIS group may refer to a group of application layers using the same NCIS session. An NCIS session may refer to a session in which all user equipments in one session, for example, user equipments belonging to the same NCIS group, may share background information, status information, update information, etc. of an NCIS application with each other. That is, all user equipments belonging to one NCIS session may have the same background information, status information, and update information. User equipments belonging to the same NCIS group may be located close to each other and use device-to-device communication (D2D communication). Alternatively, even user equipments belonging to the same NCIS group may communicate through a network when they are located far from each other.

In addition, public safety network technology, such as a public safety service (or mission critical service), may be provided in the 3GPP system. The 3GPP system uses public safety net technology to provide users with a service that enables communication for public safety in the event of a disaster. The user equipment may use a public safety net technology based on network communication or direct communication. The user equipment may transmit and receive data by using direct communication even when the network is disrupted.

The user equipment may access the AMF via a base station and exchange control plane signaling messages with a 5G core network. In addition, the user equipment may access the UPF via the base station and exchange data with a data network and a user plane. An application server that provides an application layer service to the user equipment may be referred to as an AF when exchanging control plane signaling messages with the 5G core network, and may be referred to as a DN when exchanging user plane data with the user equipment. In addition, the AF and the DN may be used interchangeably as a name referring to an application server.

A user equipment supporting direct communication may obtain configuration information for direct communication from the 5G core network (e.g., AMF, PCF, ProSe Function, etc.). The user equipment may perform various operations for direct communication (e.g., ProSe mode1, ProSe mode2, ProSe mode3, ProSe mode4, out-of-coverage, in-coverage operations, etc.) based on the configuration information for direct communication obtained from the 5G core network.

For example, the user equipment may transmit, to the base station, a message requesting resource information regarding which resource to use to transmit the message, in order to transmit the message through a PC5 interface, and the base station may select an optimal sidelink transmission resource based on a current network situation and reply to the user equipment with the selected resource. The user equipment may request, from the base station, sidelink resource information whenever sending a message. Hereinafter, in describing the present disclosure, a method in which the user equipment transmits a resource information request message to the base station and receives information about an optimal sidelink transmission resource from the base station is referred to as a mode3 operation or a mode 1 operation. When using LTE radio technology, it may be referred to as mode 3, and when using NR radio technology, it may be referred to as mode 1.

As another example, the user equipment may transmit, to the base station, a message requesting resource information, with which the message may be transmitted, in order to transmit the message through the PC5 interface, and the base station may reply to the user equipment with sidelink resource pool information available to the user equipment. The user equipment may store the sidelink resource pool information received from the base station, and may transmit a message by selecting a resource from the stored sidelink resource pool whenever a V2X message is transmitted. Alternatively, even when the user equipment does not explicitly request resource information from the base station, the base station may inform the user equipment of sidelink resource pool information through system information provided to the user equipment, and the user equipment may use the received information for resource selection when transmitting a V2X message. Hereinafter, in describing the present disclosure, a method by which the user equipment transmits a resource information request message to the base station and receives sidelink resource pool information from the base station is referred to as an in-coverage operation of mode 4 or mode 2. When using LTE radio technology, it may be referred to as mode 4, and when using NR radio technology, it may be referred to as mode 2.

As another example, sidelink resource information for transmitting a V2X message may be pre-configured in the user equipment, and the user equipment may transmit the V2X message by using the pre-configured sidelink resource information. In this method, communication between the user equipment and the base station may not be necessary. In describing the present disclosure, a method by which the user equipment uses pre-configured sidelink resource information is referred to as an out-of-coverage operation of mode 4 or mode 2. When using LTE radio technology, the above method may be referred to as mode 4, and when using NR radio technology, the above method may be referred to as mode 2.

First Embodiment

Hereinafter, in a first embodiment of the present disclosure, a service and session continuity mode (Service and Session Continuity mode, hereinafter interchangeably referred to as 'SSC mode') of a service using direct communication are defined, and examples of the SSC mode applicable in various situations are described. In addition, in the first embodiment of the present disclosure, a procedure for the user equipment to obtain SSC mode information from the 5G core network is described.

The user equipment may transmit and receive data with another user equipment by using direct communication. Direct communication may be possible when another user equipment is located within a data transmission range of the user equipment. When the other user equipment is located outside the data transmission range of the user equipment, the user equipment is not able to transmit or receive data to or from other user equipments by using direct communication. A case in which data cannot be transmitted or received as described above may be referred to as a case in which service and session continuity is not provided. In order to provide service and session continuity even when another user equipment is located outside the data transmission range of the user equipment, and the user equipment and the other user equipment are not able to transmit or receive data to or from each other by using direct communication, the user equipment may transmit data to the other user equipment through a network. When the user equipment is able to transmit or receive data through a network as described above, it may be said that service and session continuity is provided.

According to an embodiment of the present disclosure, an SSC mode of a service using direct communication may be defined in various manners. For example, in a specific service using direct communication, data may be transmitted or received only by using direct communication. In this case, when another user equipment is located outside the data transmission range of the user equipment, the user equipment is not able to transmit or receive data to or from the other user equipment by using direct communication. Hereinafter, in the present disclosure, a mode for transmitting or receiving data only through direct communication is referred to as ProSe SSC mode 1. An example of a service using ProSe SSC mode 1 may include a proximity communication service (e.g., a music streaming service by connecting a user equipment to a speaker).

As another example, in a specific service using direct communication, data may be transmitted or received by using direct communication or network communication. During a service being performed using direct communication, when another user equipment deviates from the data transmission range of the user equipment, the user equipment may switch the direction communication to network communication to continuously transmit or receive data. In this case, the user equipment may break the direct communication connection and establish a network communication connection (break-before-make). Hereinafter, in the present disclosure, a mode in which the user equipment breaks a direct communication connection and establishes a network communication connection to continuously transmit or receive data is referred to as ProSe SSC mode 2. Examples of a service using ProSe SSC mode 2 may include a service that does not affect service quality even when packet loss occurs (e.g., file transfer, etc.).

As another example, in a specific service using direct communication, data may be transmitted or received by using direct communication or network communication. During a service being performed using direct communication, even when another user equipment is within the data transmission range of the user equipment, the user equipment may switch the direction communication to network communication and continuously transmit or receive data. The user equipment may establish a network communication connection while maintaining the direct communication connection and break the direct communication connection (make-before-break). Hereinafter, in the present disclosure, a mode in which the user equipment establishes a network communication connection while maintaining a direct communication connection, and breaks the direct communication connection after establishing the network communication connection, in order to continuously transmit or receive data, is referred to as ProSe SSC mode 3. Examples of a service using ProSe SSC mode 3 may include a service that affects service quality when packet loss occurs (e.g., a voice service, etc.).

As another example, in a certain service using direct communication, both direct communication and network communication may be established, and data may be transmitted or received simultaneously by using both direct communication and network communication. When another user equipment is within the data transmission range of the user equipment, the user equipment may transmit or receive data by using both direct communication and network communication. When another user equipment is outside the data transmission range of the user equipment, the user equipment may transmit or receive data by using network communication. Hereinafter, in the present disclosure, a mode in which the user equipment transmits or receives data by using both direct communication and network communication is referred to as ProSe SSC mode 4. Examples of a service using ProSe SSC mode 4 may include a service requiring high reliability (e.g., emergency service, etc.). The user equipment may transmit the same data by using direct communication and network communication. Alternatively, the user equipment may transmit different pieces of data from each other by using direct communication or network communication.

FIG. 1 illustrates a user equipment registration procedure according to an embodiment of the present disclosure.

During the registration procedure, a UE 100 may obtain, from a 5G core network 102, information about services that use direct communication and are available to the UE 100 and information about ProSe SSC modes applicable to services using direct communication available to the UE.

Referring to FIG. 1, in operation 110, the UE 100 may perform a registration (registration or attach) process on a network (a RAN 101, the core network CN 102). A registration request (registration or attach Request) message that the UE 100 transmits to the network may include information indicating that the user equipment has ProSe Capability.

The core network 102, for example, NF (AMF for 5G, MME for 4G) supporting registration and mobility management regarding the UE 100, may process a registration request received from the UE 100 in operation 110, and may determine, based on user equipment subscription information, whether a ProSe function is available to the UE 100, a ProSe service available to the UE 100, a ProSe SSC mode of the ProSe service available to the UE 100, and the like.

Although omitted in FIG. 1, the core network 102 (e.g., AMF or MME) may transmit a registration accept (registration or attach accept) message to the UE 100. The registration accept message transmitted to the UE 100 may include at least one of a ProSe service available to the UE 100 and ProSe SSC mode information of the ProSe service available to the UE 100.

Upon receiving the registration accept message, the UE 100 may store the ProSe service and the ProSe SSC mode information of the ProSe service included in the registration accept message, and may use the same in a subsequent procedure.

Referring to FIG. 1, in operation 112, a ProSe Function 103 may request, from the core network 102, for example, the NF (AMF for 5G, MME for 4G) that supports registration and mobility management for the user equipment, an event subscription request to obtain location information of the UE 100. In operation 114, the core network 102 may process the received event subscription request. In operation 116, the core network 102 may transmit a reply message informing the ProSe Function 103 that the event subscription request has been processed. The reply message transmitted by the core network 102 to the ProSe Function 103 may include current location information of the UE 100.

In operation 118, the core network 102 may detect (or identify) that the location of the UE 100 has been changed. In operation 120, the core network 102 may notify the ProSe Function 103 of new location information of the UE.

The ProSe Function 103 may obtain the current location information of the UE 100 through the procedure described in regard to operations 112 to 120 of FIG. 1. Alternatively, the ProSe Function 103 may directly obtain the location information of the UE from the UE 100.

In addition, an application server (AF) providing a function for using a ProSe service according to an embodiment of the present disclosure may obtain the current location information of the UE 100 in a similar manner to the procedure described in regard to operations 112 to 120 of FIG. 1. In this case, the application server may operate like the ProSe Function 103 of FIG. 1. Alternatively, the application server may directly obtain the location information of the UE from the UE 100.

The user equipment according to an embodiment of the present disclosure may consider ProSe SSC mode information when using a service that uses direct communication. For example, when the user equipment intends to use a service which is in ProSe SSC mode 1, the user equipment may establish a direct communication connection and use the service. Alternatively, when the user equipment intends to use a service which is in ProSe SSC mode 4, the user equipment may establish a direct communication connection and a network communication connection to use the service. Alternatively, when the user equipment intends to use a service which is in ProSe SSC mode 2 or 3, the user equipment may select a communication path by using a method described in regard to a second embodiment of the present disclosure below.

Second Embodiment

Figure 2:
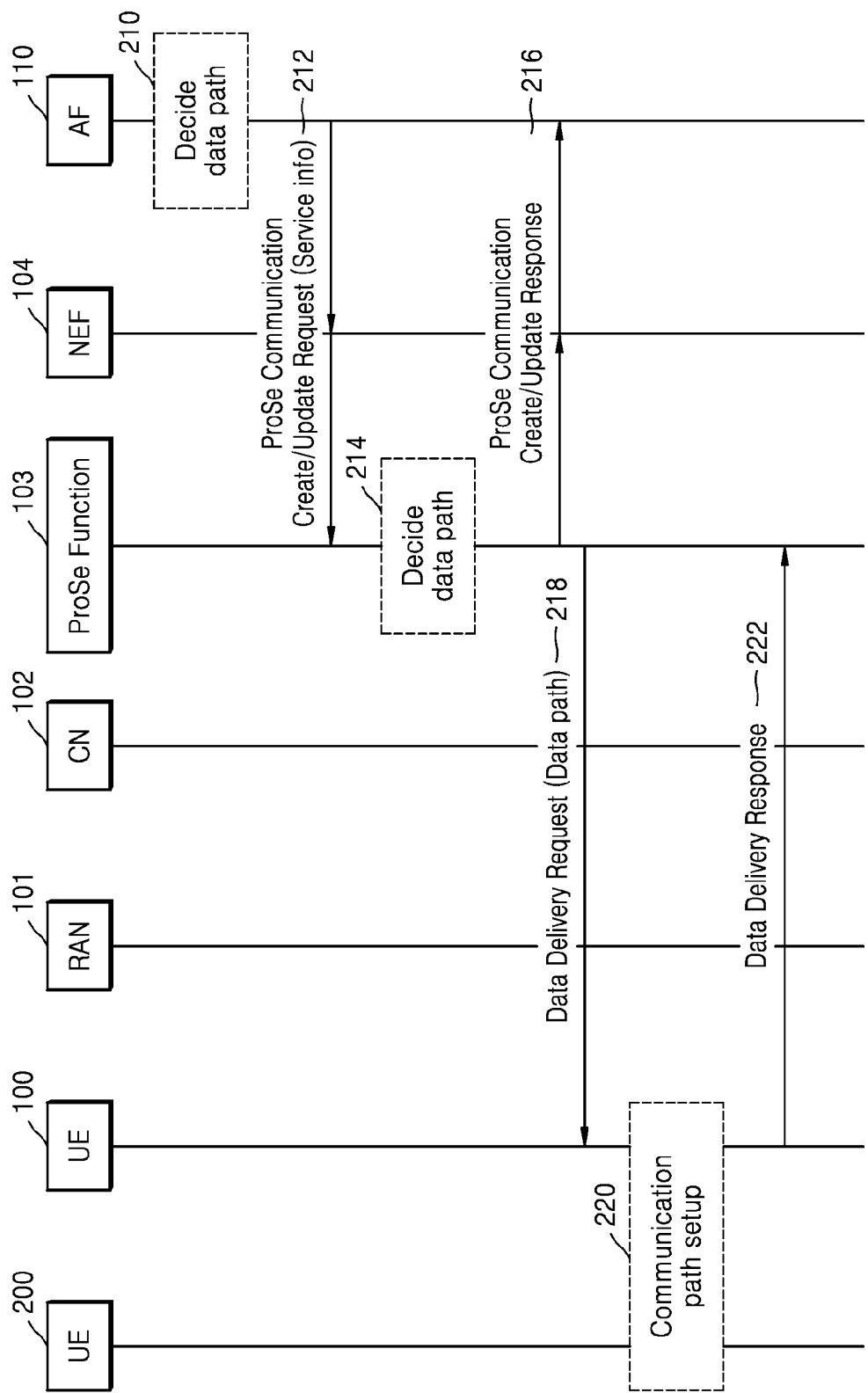
FIG. 2 is a sequence diagram illustrating a procedure in which a 5G core network provides data path information to a user equipment, according to an embodiment of the present disclosure.

In the second embodiment of the present disclosure, a method for a user equipment to determine and select a data path in order to transmit or receive data to and from another user equipment is described. A data path may include a direct communication path between user equipments and a communication (i.e., network communication) path between user equipments through a network between the user equipments. Hereinafter, a data path may refer to a path for a user equipment to transmit or receive data to and from another user equipment. FIG. 2 is a sequence diagram illustrating a procedure in which a 5G core network provides data path information to a user equipment, according to an embodiment of the present disclosure.

The UE 100 according to an embodiment of the present disclosure may perform a registration procedure with a network, as illustrated in FIG. 1, and use direct communication or network communication. The UE 100 may select a data path to transmit or receive data to and from another UE 200. For example, the UE 100 may select whether to use direct communication, network communication, or both direct communication and network communication, to transmit or receive data to and from the other UE 200. According to an embodiment of the present disclosure, an application server (AF) 201 or a core network NF (e.g., the ProSe Function 103) may determine (or select) a data path.

Referring to FIG. 2, in operation 210, the application server 201 may determine a data path between the UE 100 and the other UE 200. The application server 201 may determine a data path base on at least one of information received from the UEs 100 and 200 (e.g., information about user equipment participating in a service, current location information of the user equipment, etc.), information received from the core network 102 (e.g., the current location information of the user equipment, etc.). The current location information of the UEs 100 and 200 may include GPS, a base station cell ID, a geographical display method, and the like. However, operation 210 may be omitted, and in operation 214, the UE 100 or the ProSe Function 103 may determine a data path.

In operation 212, the application server 201 may provide service information to a core network of a serving PLMN, to which the UE 100 is connected. For example, the application server (AF) 201 may transmit a ProSe communication request message to a NEF 104. Alternatively, when the application server 110 knows serving ProSe Function information of the UE 100, the application server 110 may directly transmit a ProSe communication request message to the ProSe Function 103. The ProSe communication request message transmitted by the application server 110 to the NEF 104 or the ProSe Function 103 (e.g., a request for creating or updating ProSe communication) may include service information for ProSe communication (e.g., ID of the UE 100, ID of the other UE 200, a data path selected by the application server 110, etc.).

According to an embodiment, the NEF 104 receiving the ProSe communication request message from the application server 110 may transmit a ProSe communication request message to a ProSe function 203. For example, the NEF 104 may store service information included in the ProSe communication request message received from the application server 110, in the UDR, and the UDR may transmit a notification message including the stored service information to the ProSe Function 103. Alternatively, the NEF 104 may store service information in the UDR through the UDM, and the UDM may transmit a notification message including the service information stored in the UDR, to the ProSe Function 103. Alternatively, the NEF 104 may directly transmit the service information to the ProSe Function 103 through a ProSe communication request message.

The ProSe Function 103 may receive the service information in various manners as described above. In operation 214, the ProSe Function 103 that has received the service information may determine a data path based on the service information received from the application server 110, mobile communication operator policy (Policy, ProSe Policy), and information about the UEs 100 and 200 (e.g., location information of the user equipments, subscription information of the user equipments).

For example, in operation 212, when a message received by the ProSe Function 102 includes information about a data path, the ProSe Function 103 may determine to use the data path received from the application server 110 (that is, the data path determined by the application server 110). Alternatively, the ProSe Function 103 may determine a data path based on information received from the core network 102 (e.g., current location information of the user equipments, etc.). For example, the ProSe Function 103 may determine to use the data path received from the application server 110 or determine to use a data path different from the data path determined by the application server 110, based on the information received from the core network 102.

In operation 216, the ProSe Function 103 may reply to the application server 110 with a ProSe communication request response message. The ProSe communication request response message may include information about the data path determined by the ProSe Function 103.

In operation 218, the ProSe Function 103 may transmit a Data Delivery Request message to the UE 100. The Data Delivery Request message may include information about a data path to be used by the UE 100 to transmit or receive data to and from the other UE 200 (e.g., a data path determined by the ProSe Function 103). The Data Delivery Request message may be a message requesting the UE 100 to start ProSe communication.

The ProSe Function 103 may directly transmit a Data Delivery Request message to the UE 100 through a user plane. Alternatively, the ProSe Function 103 may transmit a Data Delivery Request message to the UE 100 through a control plane, that is, the core network NF 102 (AMF for 5G, MME for 4G) and the base station 101.

In operation 220, the UE 100 may determine a data path with the other UE 200 based on information about a data path, received from the ProSe Function 103, and establish the determined data path. For example, when the UE 100 receives information about a direct communication path from the ProSe Function 103 as the information about a data path, the UE 100 may transmit or receive data to or from the other UE 200 through a PC5 interface. Alternatively, when the UE 100 receives information about a network communication path from the ProSe Function 103 as the information about a data path, the UE 100 may transmit or receive data to or from the other UE 200 through a Uu interface. Alternatively, when the UE 100 receives, from the ProSe Function 103, as information about a data path, both information about a direct communication path and information about a network communication path, the UE 100 may transmit or receive data to or from the other UE 200 through a PC5 interface and/or a Uu interface.

In operation 222, the UE 100 may reply to the ProSe Function 103 with a Data Delivery Response message. The Data Delivery Response message may include information about a data path that the UE 100 has set with the other UE 200. The information about a data path set by the UE 100 with the other UE 200 may be the same as or different from the information about a data path, received by the UE 100 from the ProSe Function 103 in operation 218. Alternatively, the Data Delivery Response message may include information about a data path setting result indicating whether data path setting succeeded or failed by the data path received by the user equipment from the ProSe Function 103 in operation 218.

Alternatively, the UE 100 according to an embodiment of the present disclosure may determine a data path by itself. For example, the UE 100 may determine a data path based on at least one of the type of services to be used, ProSe SSC mode information linked with the services, or a location of the user equipment. The UE 100 may transmit or receive data to or from the other UE 200 through the determined data path.

The application server, the core network NF, and the user equipment according to an embodiment of the present disclosure may determine a data path for data transmission and reception. In order to determine a data path, a location of the user equipment, a relative distance between the user equipment and other user equipments, a service type, ProSe SSC mode, HPLMN information of each user equipment, etc. may be considered. For example, when the user equipment and the other user equipment are subscription user equipments of the same mobile communication operator, and the relative distance between the user equipment and the other user equipment is close enough to allow direct communication, direct communication may be used. Alternatively, when the user equipment and the other user equipment are subscription user equipments of the same mobile communication operator, and the relative distance between the user equipment and the other user equipment is not close enough to allow direct communication, network communication may be used. Alternatively, when the user equipment and the other user equipment are subscription user equipments of different mobile communication providers, network communication may be used.

The application server, the core network NF, and the user equipment according to an embodiment of the present disclosure may switch a data path for data transmission and reception. The UE 100 may establish a data path for transmitting and receiving data with the other UE 200, through the procedure shown in FIG. 2. The UE 100 may transmit or receive data to or from the other UE 200 through the established data path.

According to an embodiment, the UE 100 may transmit or receive data to or from the other UE 200 through a direct communication path. When direct communication between the UE 100 and the other UE 200 becomes impossible while data is transmitted and received through the direct communication path (e.g., when the relative distance between the user equipments is not close enough to allow direct communication, when direct communication is not supported at a location to which the user equipment has moved (e.g., when there is no radio frequency used for direct communication), etc.), the application server or core network NF may determine to switch the data path from direct communication to network communication, and may transmit information about a new data path, to the user equipment, through the procedure illustrated in FIG. 2. Alternatively, the user equipment may determine a new data path.

According to another embodiment, the UE 100 may transmit or receive data to or from the other UE 200 through a network communication path. When direct communication between the UE 100 and the other UE 200 becomes possible while data is transmitted and received through the network communication path (e.g., when the relative distance between the user equipments is close enough to allow direct communication, when direct communication is supported at a location to which the user equipment has moved (e.g., when there is a radio frequency used for direct communication, etc.), the application server or the core network NF may determine to switch the data path from network communication to direct communication, and may transmit information about a new data path, to the user equipment, through the procedure illustrated in FIG. 2. Alternatively, the user equipment may determine a new data path.

Figure 3:
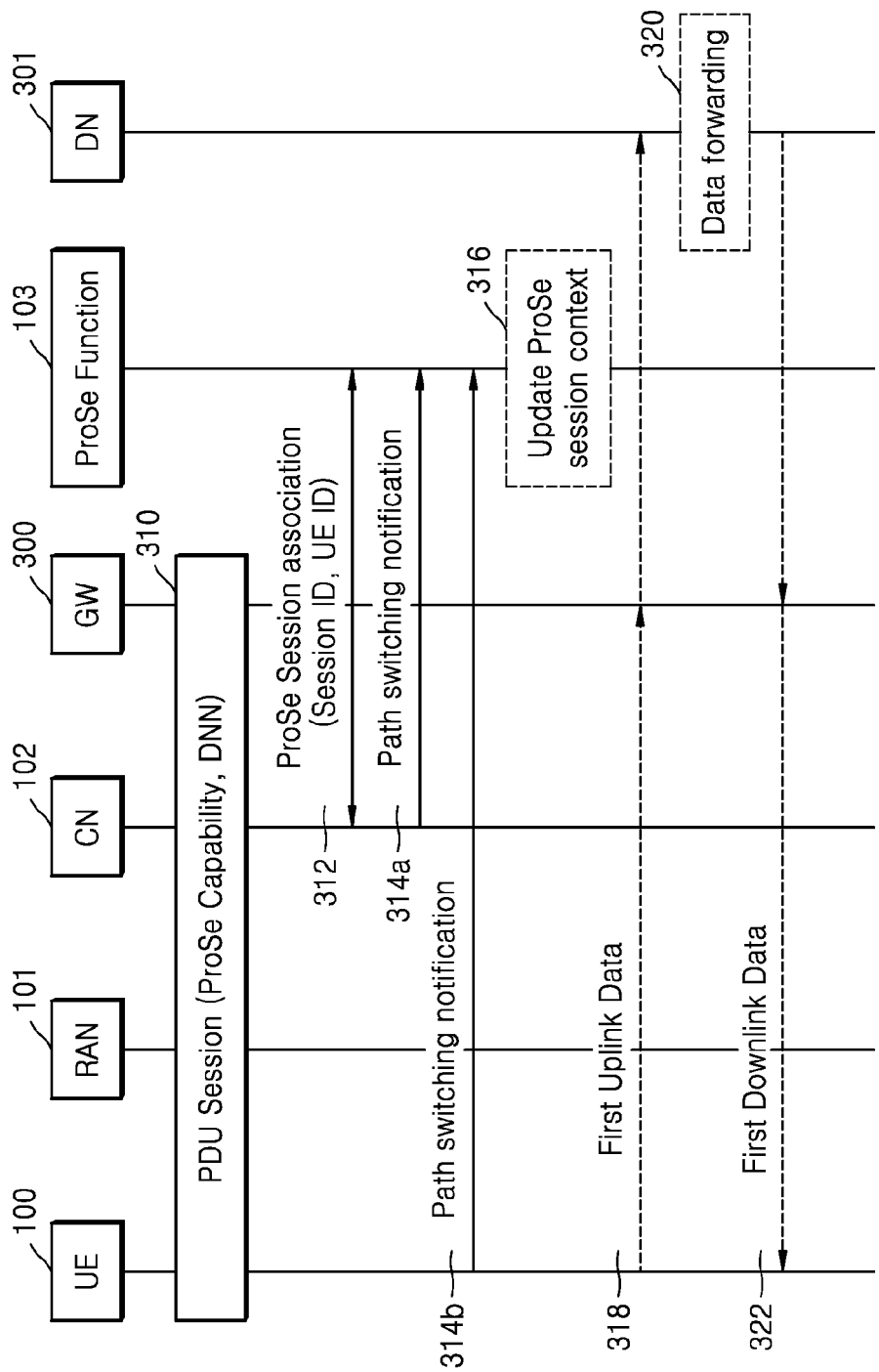
FIG. 3 is a sequence diagram illustrating a procedure for switching a data path, according to an embodiment of the present disclosure.

FIG. 3 is a sequence diagram illustrating a procedure for switching a data path, according to an embodiment of the present disclosure. In detail, FIG. 3 shows a procedure for switching a direct communication path to a network communication path.

Referring to FIG. 3, the UE 100 according to an embodiment of the present disclosure may determine to switch a data path for transmitting and receiving data with the other UE 200, from direct communication to network communication. The UE 100 may establish a network communication path to switch the data path from direct communication to network communication, and may perform a session establishment procedure to establish the network communication path.

In operation 310, the UE 100 may transmit a session establishment/modification (PDU session establishment/modification or PDN connection) request message to a network. The session establishment request message transmitted by the user equipment may include information indicating that the UE 100 has ProSe Capability (ProSe Capability Indication), and may include a Data Network Name (DNN) indicating a session to be created. The session, which the UE 100 requests the network to create, may be a session for network communication between the UE 100 and the other UE 200.

The core network 102, for example, NF (SMF for 5G, MME for 4G) supporting session management regarding a user equipment may process a session establishment request received from the UE 100. The core network 102 may know that the received session establishment request message is a session related to direct communication, based on the information received from the UE 100 (e.g., ProSe indication, DNN, etc.).

In addition, when user equipment subscription information is needed to process a session establishment request, the core network 102 may receive the user equipment subscription information from the NF (UDM for 5G, HSS for 4G) that is storing the subscription information. The user equipment subscription information may include information about whether a ProSe operation (operation for switching direct communication to network communication) is permitted or not. The SMF or MME may process a session establishment process by using the session establishment request from the user equipment and the user equipment subscription information. A ProSe Function associated with a session created during the session establishment process may be determined, and the SMF or MME may determine the ProSe Function based on one or more of the session establishment request from the user equipment, information received from the AMF, and user equipment subscription information. In addition, in order to process the session establishment request, the SMF or the MME may receive operator policy information from the PCF or the PCRF. In addition, the SMF or the MME may deliver the information (i.e., user equipment subscription information, operator policy information) to another NF (AMF or UPF in case of SMF, SGW in case of MME).

In a process of processing the session establishment request, the core network 102 may select a gateway (GW) 300 for data transmission (UPF for 5G, S/P-GW for 4G).

In operation 312, the core network 102, for example, NF (SMF for 5G, MME for 4G) supporting session management regarding a user equipment may establish a ProSe session association with the ProSe Function 103. ProSe session association may refer to an association between the core network 102 (SMF or MME) and the ProSe Function 103 to manage a session of the UE 100 for ProSe communication (e.g., to continuously transmit or receive session-related information). In a ProSe session association message transmitted or received between the core network 102 and the ProSe Function 103 to establish ProSe session association, a session ID (PDU Session ID for 5G, PDN connection ID for 4G), a user equipment ID (e.g., IMSI, GPSI, SUPI, 5G-GUTI, etc.) may be included. Based on information included in the ProSe session association message, the ProSe Function 103 may know that a service that the UE 100 is using via direct communication will be used by network communication.

In operation 314a or operation 314b, the UE 100 or the core network 102 that has completed the session establishment procedure may transmit a data path switching notification message to the ProSe Function 103. The data path switching notification message may include information indicating the ProSe session association of operation 312.

For example, information indicating ProSe session association may include a session ID, a user equipment ID, and the like. Based on the information indicating ProSe session association, the ProSe Function 103 may know that a service being used by the UE 100 via direct communication has been switched to network communication, and may update a ProSe session context in operation 316. The ProSe session context may include information related to a ProSe session of the UE 100.

After completing the session establishment, the UE 100 may transmit uplink data to a DN 301 in operation 318. The uplink data may be data transmitted by the UE 100 to the DN 301 or the other UE 200. In operation 320, the DN 301 may process transmission of data received from the UE 100 in operation 318. The data transmission process of operation 320 will be described in detail with reference to FIG. 4. In operation 322, when there is data to be transmitted to the UE 100, the DN 301 may transmit downlink data. The downlink data may be data transmitted by the DN 301 or the other UE 200 to the UE 100.

When a service being used corresponds to ProSe SSC mode 2 (break-before-make), the UE 100 that switches the data path according to an embodiment of the present disclosure may terminate direct communication before starting the session establishment procedure described in FIG. 3, during the session establishment procedure, or after completing the session establishment procedure and before transmitting uplink data in operation 318.

Alternatively, when a service being used corresponds to ProSe SSC mode 3 (make-before-break), the UE 100 may complete the session establishment procedure described in FIG. 3, and terminate direct communication after transmitting uplink data in operation 318.

Figure 4:
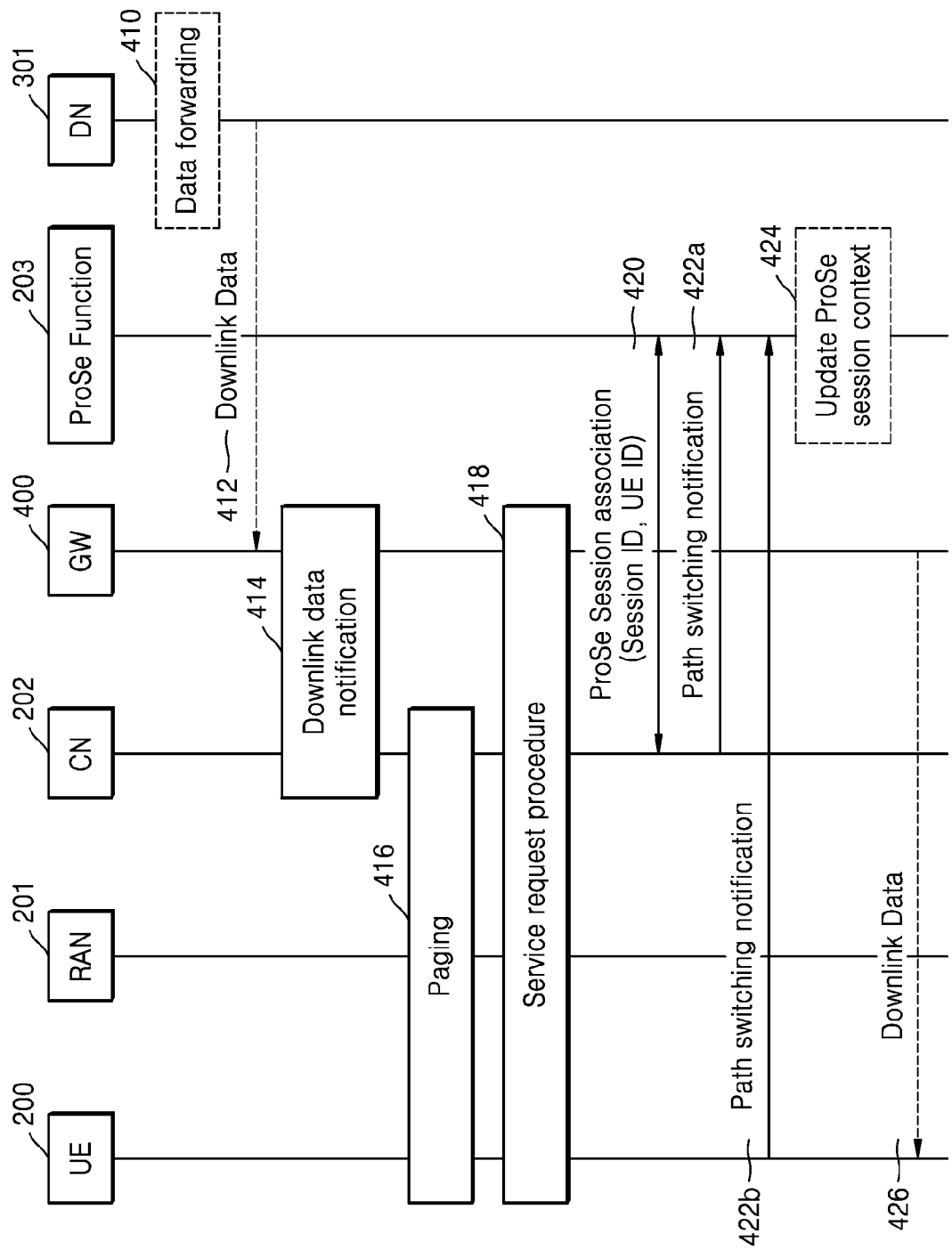
FIG. 4 is a sequence diagram illustrating a procedure for switching a data path, according to an embodiment of the present disclosure.

FIG. 4 is a sequence diagram illustrating a procedure for switching a data path, according to an embodiment of the present disclosure. In detail, FIG. 4 illustrates a procedure for switching a direct communication path to a network communication path.

Referring to FIG. 4, in operation 410, the DN 301 may process transmission of downlink data transmitted to the UE 200. The downlink data may be data transmitted by the DN 301 to the UE 200 or data received by the DN 301 from the UE 100 and transmitted to the UE 200 in operation 320 of FIG. 3.

In operation 412, the DN 301 may transmit downlink data to a GW 400 (UPF for 5G, S/P-GW for 4G). When there is no base station information for transmitting the downlink data received from the DN 301, in the GW 400, the GW 400 may transmit a downlink data notification (DDN) to a core network 202 in operation 414. The core network 202, for example, an NF supporting mobility management regarding a user equipment (AMF for 5G, MME for 4G) may transmit a paging message to the UE 200 in operation 416. Upon receiving the paging message, the UE 200 may perform a service request procedure in operation 418.

In operation 420, the core network 202, for example, NF supporting session management for a user equipment (SMF for 5G, MME for 4G), may establish a ProSe session association with the ProSe Function 203. A ProSe session association message transmitted or received between the core network 202 and the ProSe Function 203 may include a session ID (PDU Session ID for 5G, PDN connection ID for 4G), a user equipment ID (e.g., IMSI, GPSI, SUPI, 5G-GUTI, etc.). Based on the information included in the ProSe session association message, the ProSe Function 203 may know that a service that the UE 200 is using via direct communication will be used by network communication.

In operation 422a or operation 422b, the UE 200 or the core network 202 that has completed the session modification procedure may transmit a data path switching notification message to the ProSe Function 203. The data path switching notification message may include information indicating the ProSe session association of operation 420. For example, information indicating ProSe session association may include a session ID, a user equipment ID, and the like. The ProSe function 203 may know, based on the information indicating the ProSe session association, that the service being used by the UE 200 via direct communication is switched to network communication, and may update the ProSe session context in operation 424.

In operation 426, the GW 400 may transmit the downlink data received from the DN 301, to the UE 200.

When a service being used corresponds to ProSe SSC mode 2 (break-before-make), the UE 200 that switches a data path according to an embodiment of the present disclosure may terminate direct communication before starting the session switching procedure described in FIG. 4 or during the session switching procedure.

Alternatively, when a service being used corresponds to ProSe SSC mode 3 (make-before-break), the UE 100 may complete the session switching procedure described in FIG. 4, and terminate direct communication after transmitting downlink data in operation 426.

Figure 5:
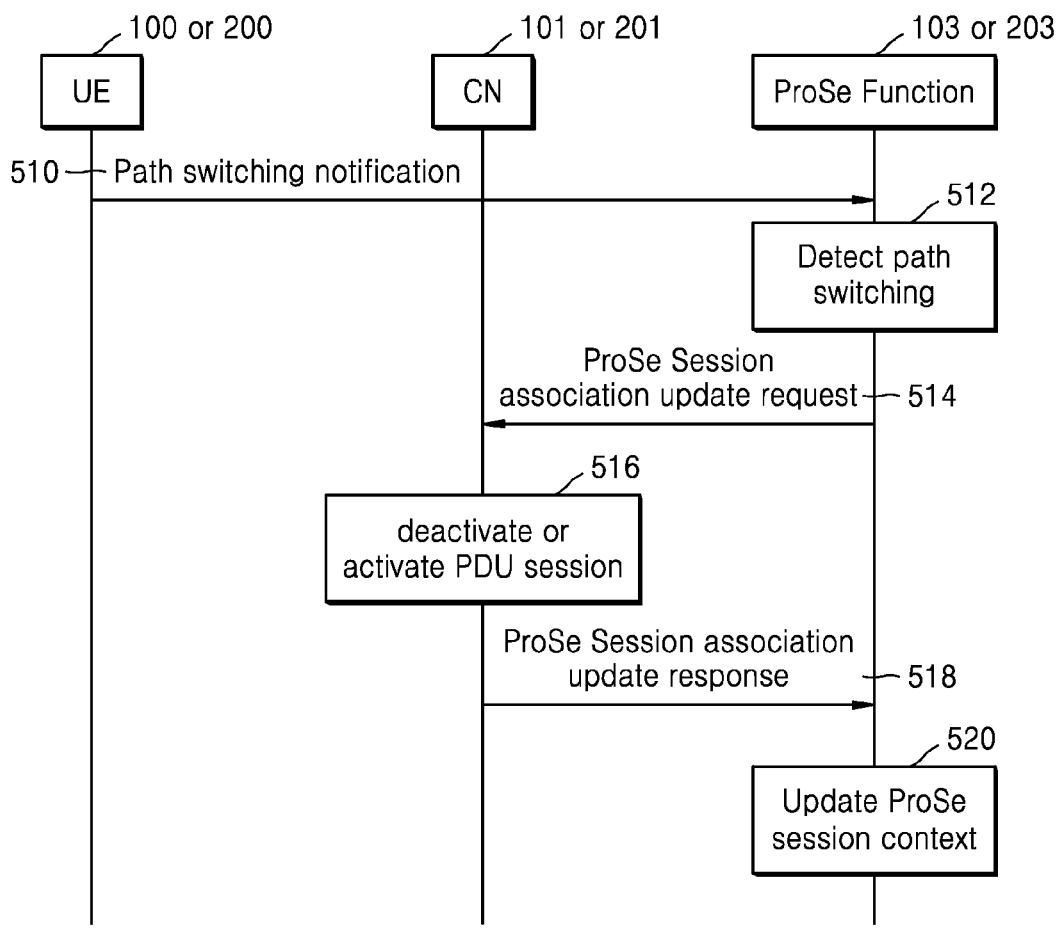
FIG. 5 is a sequence diagram illustrating a procedure for switching a data path, according to an embodiment of the present disclosure.

FIG. 5 is a sequence diagram illustrating a procedure for switching a data path, according to an embodiment of the present disclosure. In detail, FIG. 5 illustrates a procedure for switching a network communication path to a direct data communication path.

Referring to FIG. 5, the UE 100 or 200 that has switched a network communication path to a direct communication path, according to an embodiment of the present disclosure, may transmit a data path switching notification message to the ProSe Function 103 or 203 in operation 510. The data path switching notification message may include a session ID (PDU Session ID for 5G, PDN connection ID for 4G), user equipment ID (e.g., IMSI, GPSI, SUPI, 5G-GUTI, or the like). In operation 512, the ProSe Function 103 or 203 may know, based on the information included in the data path switching notification message, that the service that the UE 100 or 200 is using via network communication is scheduled to be switched or has been switched to direct communication.

In operation 514, the ProSe Function 103 or 203 may transmit, to the core network 102 or 202 NF (e.g., SMF or MME) which manages a session to be switched, a ProSe session association update request message. The ProSe session association update request message may include information indicating that the data path of the UE 100 or 200 is to be switched or has been switched to direct communication (e.g., information about a session to be switched). For example, in the ProSe session association update request message, the session ID (PDU Session ID for 5G, PDN connection ID for 4G) of the session to be switched, and user equipment ID (e.g., IMSI, GPSI, SUPI, 5G-GUTI, etc.) may be included. The core network 102 or 202 NF may know, based on the information included in the ProSe session association update request message, that the service that the UE 100 or 200 is using via network communication is scheduled to be switched or has been switched to direct communication.

In operation 516, the core network 102 or 202 NF may proceed with activation or deactivation of a PDU session related to data path switching. For example, when the UE 100 or 200 switches the service being used via network communication to direct communication, the core network 102 or 202 NF may deactivate a PDU session activated for network communication.

In operation 518, the core network 102 or 202 NF may reply to the ProSe Function 103 or 203 with a ProSe session association update response message. In operation 520, the ProSe Function 103 or 203 may update the ProSe session context related to the ProSe session of the UE 100 or 200 based on the ProSe session association update response message.

Figure 6:
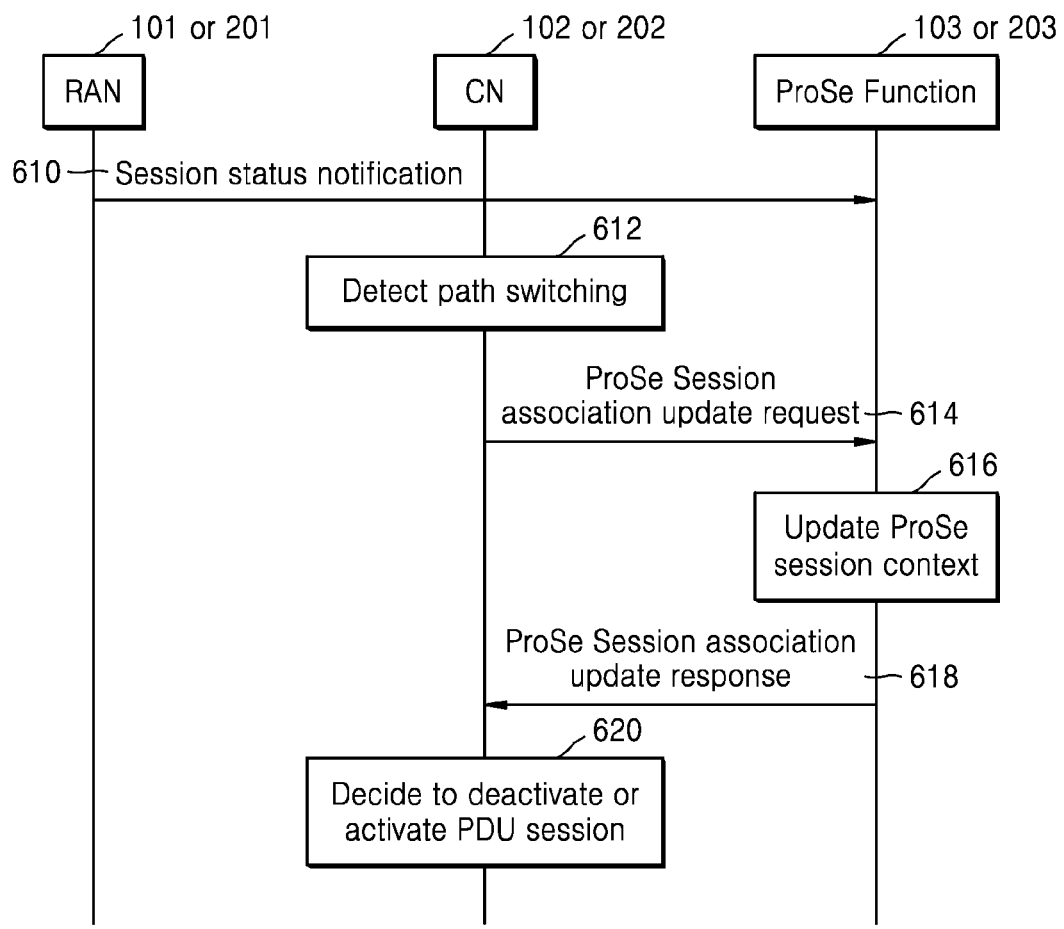
FIG. 6 is a sequence diagram illustrating a procedure for switching a data path, according to an embodiment of the present disclosure.

FIG. 6 is a sequence diagram illustrating a procedure for switching a data path, according to an embodiment of the present disclosure. In detail, FIG. 6 illustrates a procedure for switching a network communication path to a direct data communication path.

Referring to FIG. 6, in operation 610, the base station (RAN) 101 or 201 according to an embodiment of the present disclosure may transmit a session status notification message of a session being used by the user equipment, to the core network 102 or 202 NF (e.g., AMF, SMF or MME). The session status notification message may include a session ID (PDU Session ID for 5G, PDN connection ID for 4G) and user equipment ID (e.g., IMSI, GPSI, SUPI, 5G-GUTI, etc.). In operation 612, the core network 102 or 202 NF may know, based on the information included in the session status notification message, that the service being used by the user equipment via network communication is scheduled to be switched or has been switched to direct communication.

In operation 614, the core network 102 or 202 NF may transmit a ProSe session association update request message to a ProSe Function that manages a session to be switched. The ProSe session association update request message may include information indicating that the data path of the UE 100 or 200 is to be switched to or has been switched to direct communication (e.g., information about a session to be switched). For example, in the ProSe session association update request message, a session ID (PDU Session ID for 5G, PDN connection ID for 4G) of the session to be switched, and user equipment ID (e.g., IMSI, GPSI, SUPI, 5G-GUTI, etc.) may be included. In operation 616, the ProSe Function may know, based on the information included in the ProSe session association update request message, that the service that the user equipment is using via network communication is to be switched to or has been switched to direct communication, and may update the ProSe session context related to the ProSe session of the UE 100 or 200 based on the ProSe session association update request message.

In operation 618, the ProSe Function 103 or 203 may reply to the core network 102 or 202 NF with a ProSe Session association update response message.

In operation 620, the core network 102 or 202 NF may proceed with activation or deactivation of a PDU session related to data path switching. For example, when the user equipment switches the service being used via network communication to direct communication, the core network 102 or 202 NF may deactivate a PDU session activated for network communication.

Figure 7:
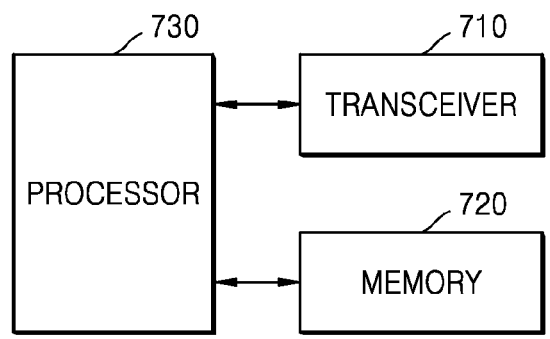
FIG. 7 is a block diagram illustrating a detailed structure of a user equipment according to an embodiment of the present disclosure.

FIG. 7 is a block diagram illustrating a detailed structure of a user equipment according to an embodiment of the present disclosure. The user equipment of FIG. 7 may refer to the UE 100 or 200 of FIG. 2.

As illustrated in FIG. 7, the user equipment of the present disclosure may include a processor 730, a transceiver 710, and a memory 720. However, the components of the user equipment are not limited to the above-described example.

For example, the user equipment may include more or fewer components than the above-described components. In addition, the processor 730, the transceiver 710, and the memory 720 may be implemented in the form of a single chip.

According to an embodiment, the processor 730 may control a series of processes in which the user equipment may operate according to the embodiment of the present disclosure described above. For example, the processor 730 may control the components of the user equipment to perform the direct communication session management method according to the embodiment of the present disclosure. A plurality of processors 730 may be included, and the processor 730 may perform an operation for protecting information of the present disclosure described above by executing a program stored in the memory 720.

The transceiver 710 may transmit or receive a signal to or from a base station. A signal transmitted or received to or from a base station may include control information and data. The transceiver 710 may include an RF transmitter for up-converting and amplifying a frequency of a transmitted signal, and an RF receiver for performing low-noise amplification on the received signal and down-converting the received signal. However, the transceiver 710 is only an example, and the components of the transceiver 710 are not limited to the RF transmitter and the RF receiver. In addition, the transceiver 710 may receive a signal via a radio channel and output the same to the processor 730, and transmit the signal output from the processor 730, via a radio channel.

According to an embodiment, the memory 720 may store program and data required for operation of the user equipment. In addition, the memory 720 may store control information or data included in a signal transmitted or received by the user equipment. The memory 720 may be configured in a storage medium, such as ROM, RAM, a hard disk, CD-ROM, or DVD, or a combination thereof. In addition, a plurality of memories 720 may be included. According to an embodiment, the memory 720 may store a program for establishing group communication by using D2D communication which are the embodiments of the present disclosure described above.

Figure 8:
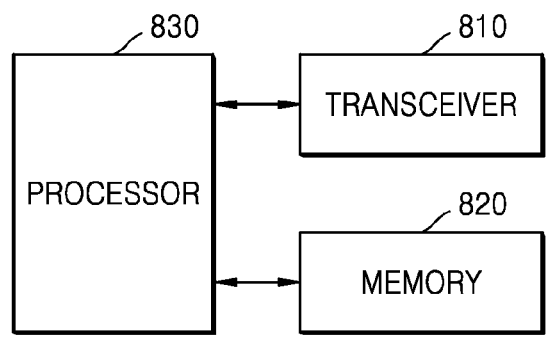
FIG. 8 is a block diagram illustrating a detailed structure of a base station according to an embodiment of the present disclosure.

FIG. 8 is a block diagram illustrating a detailed structure of a base station according to an embodiment of the present disclosure. The base station of FIG. 8 may include the RAN 101 or 201 of FIGS. 1 to 6.

As illustrated in FIG. 8, the base station of the present disclosure may include a processor 830, a transceiver 810, and a memory 820. However, the components of the base station are not limited to the above-described example. For example, the base station may include more or fewer components than the above-described components. In addition, the processor 830, the transceiver 810, and the memory 820 may be implemented in the form of a single chip.

The processor 830 may control a series of operations such that the base station may operate according to the embodiments of the present disclosure described above. For example, the processor 830 may control the components of the base station to perform the direct communication session management method according to the embodiment of the present disclosure.

The transceiver 810 may transmit or receive a signal to or from a user equipment. A signal transmitted to or from a user equipment may include control information and data. The transceiver 810 may include an RF transmitter for up-converting and amplifying a frequency of a transmitted signal, and an RF receiver for low-noise amplifying and down-converting a received signal. However, the transceiver 810 is only an example, and the components of the transceiver 810 are not limited to the RF transmitter and the RF receiver. In addition, the transceiver 810 may receive a signal via a radio channel and output the same to the processor 830, and transmit the signal output from the processor 830, via a radio channel. There may be a plurality of processors 830, and the processor 830 may perform an operation for protecting the information of the present disclosure described above by executing a program stored in the memory 820.

According to an embodiment, the memory 820 may store program and data required for operation of a base station. In addition, the memory 820 may store control information or data included in a signal transmitted or received by the base station. The memory 820 may be configured in a storage medium, such as ROM, RAM, a hard disk, CD-ROM, or DVD, or a combination thereof. Also, a plurality of memories 820 may be included. According to an embodiment, the memory 820 may store a program for executing the direct communication session management method which is the embodiments of the present disclosure described above.

Figure 9:
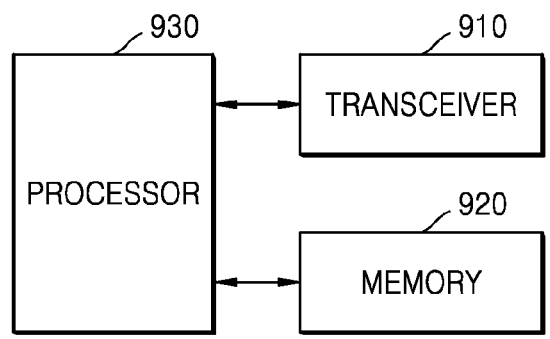
FIG. 9 is a block diagram illustrating a structure of a core network object according to an embodiment of the present disclosure.

FIG. 9 is a block diagram illustrating a structure of a core network object according to an embodiment of the present disclosure. The term 'unit', ' . . . er(or)' used herein refers to a unit for processing at least one function or operation, and may be implemented by hardware or software or a combination of hardware and software. For example, the core network object may include a ProSe Function.

Referring to FIG. 9, the core network object may be configured by including a transceiver 910, a memory 920, and a processor 930.

The transceiver 910 may provide an interface for performing communication with other devices in a network. That is, the transceiver 910 may convert a bit string transmitted from the core network object to another device, into a physical signal, and convert a physical signal received from another device, into a physical signal. That is, the transceiver 910 may transmit and receive a signal. Accordingly, the transceiver 910 may be referred to as a modem, a transmitter, a receiver, a communication unit, or a communication module. Here, the transceiver 910 enables the core network object to communicate with other devices or systems through a backhaul connection (e.g., wired backhaul or wireless backhaul) or other connection methods or through a network.

The memory 920 may store data such as a basic program, an application program, and setting information for the operation of the core network object. The memory 920 may be configured with a volatile memory, a non-volatile memory, or a combination of a volatile memory and a non-volatile memory. In particular, the memory 920 may provide stored data according to a request from the processor 930.

The processor 930 may control overall operations of the core network object. For example, the processor 930 may transmit or receive a signal through the transceiver 910. Also, the processor 930 may write data to and read data from the memory 920. To this end, the processor 930 may include at least one processor. The processor 930 may control the core network object to perform the operations according to the various embodiments described above. For example, the processor 930 may control the components of the core network object to perform the direct communication session management method according to the embodiments of the present disclosure.

Methods according to the embodiments described in the claims or the specification of the present disclosure may be implemented in the form of hardware, software, or a combination of hardware and software.

When implemented as software, a computer-readable storage medium or a computer program product storing one or more programs (e.g., software modules) may be provided. The one or more programs stored in the computer-readable storage medium or the computer program product are configured for execution by one or more processors in an electronic device. The one or more programs include instructions directing the electronic device to execute the methods according to embodiments of the present disclosure as described in the claims or the specification of the present disclosure.

The programs (e.g., software modules or software) may be stored in random access memory (RAM), non-volatile memory including flash memory, read-only memory (ROM), electrically erasable programmable read-only memory (EEPROM), a magnetic disc storage device, compact disc-ROM (CD-ROM), digital versatile discs (DVDs), another type of optical storage device, or a magnetic cassette. Alternatively, the programs may be stored in a memory including a combination of some or all of the above-mentioned memories. In addition, each constituent memory may be included by a plural number.

The programs may also be stored in an attachable storage device which is accessible through a communication network such as the Internet, an intranet, a local area network (LAN), a wide LAN (WLAN), or a storage area network (SAN), or a combination thereof. The storage device may be connected through an external port to a device performing the embodiments of the present disclosure. Another storage device on the communication network may also be connected to a device performing the embodiments of the present disclosure.

In the above-described embodiments of the present disclosure, components included in the present disclosure are expressed in a singular or plural form according to the embodiments of the present disclosure. However, the singular or plural form is appropriately selected for convenience of explanation, and the present disclosure is not limited thereto. As such, a component expressed in a plural form may also be configured as a single component, and an component expressed in a singular form may also be configured as plural components.

The embodiments disclosed in the present specification and drawings are only presented as specific examples to better explain the present disclosure and help the understanding of the present disclosure, and are not intended to limit the scope of the present disclosure. That is, it will be apparent to those of ordinary skill in the art to which the present disclosure pertains that other modifications may be made based on the present disclosure. Also, the embodiments may be combined with each other as required. For example, parts of one embodiment and another embodiment of the present disclosure may be combined with each other. In addition, the embodiments may be implemented in other systems, for example, LTE systems, 5G or NR systems, and other modifications based on the embodiments described above may also be made.

The invention claimed is:

1. A method performed by a user equipment (UE) in a wireless communication system, the method comprising:
   receiving information about a communication path from a network entity, wherein the information about the communication path indicates a path through a Uu interface or a path through a PC5 interface;
   selecting, based on the information about the communication path, a communication path for a proximity-based service (ProSe) service as the path through the Uu interface or the path through the PC5 interface; and
   performing a communication with another UE via the selected communication path,
   wherein in case that the information about the communication path indicates the path through the PC5 interface and the UE and the another UE are not close to each other, the communication path for the ProSe service is selected as the path through the Uu interface.

2. The method of claim 1, wherein the information about the communication path is determined by the network entity based on service information provided by a ProSe application server, the service information including information about a path selected by the ProSe application server.

3. The method of claim 1, wherein the network entity is a policy control function (PCF).

4. The method of claim 1, further comprising performing a registration procedure with a network.

5. A user equipment (UE) in a wireless communication system, the UE comprising:
   a transceiver; and
   a processor coupled with the transceiver and configured to:
   receive information about a communication path from a network entity, wherein the information about the communication path indicates a path through a Uu interface or a path through a PC5 interface;
   select, based on the information about the communication path, a communication path for a proximity-based service (ProSe) service as the path through the Uu interface or the path through the PC5 interface; and
   perform a communication with another UE via the selected communication path,
   wherein in case that the information about the communication path indicates the path through the PC5 interface and the UE and the another UE are not close to each other, the communication path for the ProSe service is selected as the path through the Uu interface.

6. The UE of claim 5, wherein the information about the communication path is determined by the network entity based on service information provided by a ProSe application server, the service information including information about a path selected by the ProSe application server.

7. The UE of claim 5, wherein the network entity is a policy control function (PCF).

8. The UE of claim 5, wherein the processor is further configured to perform a registration procedure with a network.

* * * * *